(12) United States Patent
Dehmann et al.

(10) Patent No.: US 9,802,484 B2
(45) Date of Patent: Oct. 31, 2017

(54) METHOD AND DISPLAY DEVICE FOR TRANSITIONING DISPLAY INFORMATION

(75) Inventors: Rainer Dehmann, Berlin (DE); Mathias Kuhn, Berlin (DE); Frank Hauschild, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 717 days.

(21) Appl. No.: 13/501,060

(22) PCT Filed: Sep. 13, 2010

(86) PCT No.: PCT/EP2010/005599
§ 371 (c)(1),
(2), (4) Date: Jun. 25, 2012

(87) PCT Pub. No.: WO2011/042110
PCT Pub. Date: Apr. 14, 2011

(65) Prior Publication Data
US 2012/0293534 A1    Nov. 22, 2012

(30) Foreign Application Priority Data

Oct. 9, 2009  (DE) .................. 10 2009 048 834

(51) Int. Cl.
*G09G 5/00*        (2006.01)
*B60K 35/00*       (2006.01)
(Continued)

(52) U.S. Cl.
CPC ............. *B60K 35/00* (2013.01); *B60K 37/06* (2013.01); *G06F 3/048* (2013.01); *G06T 3/00* (2013.01);
(Continued)

(58) Field of Classification Search
None
See application file for complete search history.

(56) References Cited

U.S. PATENT DOCUMENTS 5,463,725 A   10/1995  Henckel et al.
5,754,809 A   5/1998   Gandre
(Continued)

FOREIGN PATENT DOCUMENTS

DE   198 08 464   9/1999
DE   199 41 956   3/2001
(Continued)

OTHER PUBLICATIONS

International Search Report, issued in corresponding International Application No. PCT/EP2010/005599.
(Continued)

*Primary Examiner* — Anh-Tuan V Nguyen
(74) *Attorney, Agent, or Firm* — Andrews Kurth Kenyon LLP

(57) ABSTRACT

A method for displaying information, in which at least one first graphical object is graphically displayed on a display area, and, in the case of a change to a second graphical object, a control device generates graphic data that control the display area in a manner that causes the first object to disappear and the second object to be faded in. In the case of a change to the second object, the control device generates graphic data that control the display area such that, in the perspective representation on the display area, the first graphical object is swiveled out about a first axis disposed outside of the display area; and, in the perspective representation on the display area, the second graphical object is swiveled in about a second axis disposed outside of the display area, until it is fully displayed.

12 Claims, 6 Drawing Sheets

(51) Int. Cl.
*B60K 37/06* (2006.01)
*G06F 3/048* (2013.01)
*G06T 3/00* (2006.01)
*G06T 13/80* (2011.01)

(52) U.S. Cl.
CPC ...... *G06T 13/80* (2013.01); *B60K 2350/2017* (2013.01); *B60W 2520/10* (2013.01)

(56) References Cited

U.S. PATENT DOCUMENTS

| | | | |
|---|---|---|---|
| 5,880,733 | A | 3/1999 | Horvitz et al. |
| 6,538,635 | B1 | 3/2003 | Ringot |
| 6,628,283 | B1* | 9/2003 | Gardner ............... 345/427 |
| 7,253,821 | B2* | 8/2007 | Shimizu ............... 345/619 |
| 7,304,635 | B2 | 12/2007 | Seet et al. |
| 7,493,572 | B2 | 2/2009 | Card et al. |
| 7,495,631 | B2* | 2/2009 | Bhakta et al. ............ 345/1.1 |
| 7,747,968 | B2* | 6/2010 | Brodersen et al. ........ 715/821 |
| 7,937,668 | B2* | 5/2011 | Yoshida ............ G06F 3/04815 715/782 |
| 8,327,291 | B2* | 12/2012 | Oguchi ............ B60K 35/00 345/173 |
| 8,447,421 | B2* | 5/2013 | Capio ............ G06F 17/30029 700/94 |
| 8,904,306 | B1* | 12/2014 | Whitney ............ G06F 3/0485 345/156 |
| 2001/0017624 | A1* | 8/2001 | Noettling ............... 345/421 |
| 2003/0112279 | A1 | 6/2003 | Irimajiri |
| 2004/0233239 | A1* | 11/2004 | Lahdesmaki ......... G06F 3/0482 715/810 |
| 2005/0151742 | A1* | 7/2005 | Hong ............ G06T 19/00 345/473 |
| 2006/0055789 | A1 | 3/2006 | Jin et al. |
| 2007/0013699 | A1* | 1/2007 | Nelson et al. .......... 345/473 |
| 2007/0157126 | A1 | 7/2007 | Tschirhart et al. |
| 2007/0236493 | A1* | 10/2007 | Horiuchi et al. ......... 345/419 |
| 2008/0022228 | A1* | 1/2008 | Kwon ............... G06F 3/04817 715/838 |
| 2008/0074427 | A1* | 3/2008 | Barth ............ 345/502 |
| 2008/0161997 | A1 | 7/2008 | Wengelnik et al. |
| 2009/0064039 | A1* | 3/2009 | Lee et al. ............... 715/810 |
| 2009/0217187 | A1* | 8/2009 | Kendall et al. .......... 715/765 |
| 2009/0278852 | A1* | 11/2009 | Reese et al. ............ 345/581 |
| 2010/0058242 | A1 | 3/2010 | Kimoto |
| 2010/0064222 | A1* | 3/2010 | Tilton ............ 715/732 |
| 2010/0073773 | A1* | 3/2010 | Hotta et al. ............ 359/630 |
| 2010/0283781 | A1* | 11/2010 | Kriveshko ............ G06T 17/00 345/419 |
| 2011/0179363 | A1 | 7/2011 | Dehmann et al. |
| 2011/0187749 | A1 | 8/2011 | Dehmann et al. |

FOREIGN PATENT DOCUMENTS

| | | |
|---|---|---|
| DE | 100 58 244 | 5/2002 |
| DE | 103 05 341 | 8/2004 |
| DE | 10 2004 048 956 | 4/2006 |
| DE | 10 2006 062 416 | 11/2007 |
| DE | 10 2006 032 118 | 1/2008 |
| DE | 10 2007 039 444 A1 | 2/2009 |
| JP | 2002-163103 A | 6/2002 |
| JP | 2002-175139 A | 6/2002 |
| JP | 2006-107424 A | 4/2006 |
| JP | 2010-055145 A | 3/2010 |
| WO | 2006/108617 | 10/2006 |
| WO | 2009/024474 | 2/2009 |
| WO | 2010/010025 | 1/2010 |

OTHER PUBLICATIONS

International Preliminary Report on Patentability, dated Apr. 11, 2012, in corresponding International Application No. PCT/EP2010/005599. (English-language translation).

* cited by examiner

METHOD AND DISPLAY DEVICE FOR TRANSITIONING DISPLAY INFORMATION

FIELD OF THE INVENTION

The present invention relates to a method for displaying information. The method provides for at least one first graphical object to be graphically displayed on a display area. In addition, in the case of a change to a second graphical object, a control device generates graphic data that control the display area in a manner that causes the first object to disappear and the second object to be faded in. The present invention also relates to a display device for displaying information, having a display area for graphically displaying graphical objects and having a control device which, in response to a change from a first graphical object to a second graphical object, may generate graphic data that control the display area in a manner that causes the first object to disappear and the second object to be faded in. The display device is, in particular, part of a vehicle. However, it may also be used in conjunction with other devices, in particular portable devices, such as a music player, a cell phone or a mobile navigation system.

BACKGROUND INFORMATION

The increasing number of electronic devices in the vehicle has made it necessary to display a greater quantity of information therein. Modern vehicles encompass a multitude of driver assistance systems, for example, whose information must be displayed in the vehicle. Moreover, vehicles often include a navigation system. Such a navigation system may be used to display digital geographic road maps including a route and, in some instances, multifarious supplementary information. Finally, in many cases, modern vehicles encompass communication and multimedia applications, including a cell phone interface and devices for playing back music and voice. For these applications, it must also be possible to display information in the vehicle.

To be able to flexibly display the multifarious information, freely programmable displays are used, for example, which frequently assume the playback task performed by conventional mechanical instruments. German Published Patent Application No. 10 2006 032 118 describes an instrument cluster for a motor vehicle, for example, that includes a display which may be used to variably display the velocity of the motor vehicle, the speed of the motor vehicle engine, the temperature of the motor vehicle engine, the tank level and/or the time. Moreover, information from a navigation system, a phone, a music system, an infotainment system and/or an air conditioning system may be displayed.

In addition to the instrument cluster, a display device, in which further information may be displayed, is frequently configured above the center console of the vehicle. This display device is used, in particular, as a multifunctional display and for displaying a geographic map of a navigation system. Such a multifunctional display is described, for example, in German Published Patent Application No. 199 41 956.

PCT Published Patent Application No. WO 2009/024474 describes a method for displaying information where a two-dimensional object is graphically displayed on a display. The graphical object includes a display field and an operator control field. The display field is shown on one side of the two-dimensional graphical object and the operator control field on the other side thereof. In response to an input by an input device, the graphic data to be displayed on the display are modified in a manner that causes the graphical object to rotate from one side to the other in a perspective representation on the display.

Very special requirements arise in connection with the displaying of information in a vehicle. In the vehicle, the information is acquired, inter alia, by the driver. Thus, it is imperative that the information be displayed in the vehicle in a manner that does not distract the driver when he/she acquires information while driving. Therefore, the driver should be able to intuitively and quickly acquire the displayed information, so that he/she only needs to avert his/her gaze very briefly from the driving situation in order to acquire information. If the operation of the vehicle devices is supported or managed by a display, the display should be provided in a manner that only requires the driver to glance very quickly at the display in order to implement the operation.

Also, when information is displayed in mobile devices, it should be able to be acquired quickly and intuitively. It is, namely, often the case that the user of the mobile device acquires the displayed information while he/she is performing other tasks. In this context, the problem also arises that the display area of a mobile device is often relatively small, so that it is especially important that the displayed information be readily comprehensible, and that a change in the information content be easy to follow.

SUMMARY

Example embodiments of the present invention provide a method and a display device that allow the viewer to simply and intuitively grasp a change in the displayed information.

The method according to example embodiments of the present invention is characterized in that, in the case of a change to the second object, a control device generates graphic data that control the display area such that, in the perspective representation on the display area, the first graphical object is swiveled out about a first axis disposed outside of the display area, and, in the perspective representation on the display area, the second graphical object is swiveled in about a second axis disposed outside of the display area.

An information display may be provided that makes the change between two graphical objects readily and intuitively comprehensible. Particularly when working with menu-driven graphic systems, the information representation has the effect of reducing the degree of complexity and of making the structure of the menu-driven system more understandable. In conventional methods for displaying information, the changing of the content often takes place in a very abstract process. This can lead to comprehension difficulties for the user. Moreover, the type of graphic representation increases the complexity of the process perceived by the user when the information is changed. This may be avoided by the method described herein. The method leads to the user being able to more easily comprehend the system underlying the information display. As a result, when acquiring information, the user is less distracted from other activities. Therefore, applying the method in a vehicle enhances safety during driving of the vehicle in cases where the information is acquired by the driver.

In the method, the first axis, about which the first object is swiveled out, and the second axis, about which the second object is swiveled in, may coincide. The first and/or the second axis may be set apart from the display area. However, they may also coincide with an edge side thereof. Moreover, the first and/or the second axis are/is oriented in parallel to one side of the display area.

The first and the second object may swivel in the same direction of rotation. In addition, at least one portion of the second object may be displayed only when the first object is no longer displayed. In this case, the first object disappears, initially completely, before the second object is swiveled in.

The sharpness of the display content may change within the first and/or the second object during swiveling. The sharpness of the display content within the first object decreases, in particular, in response to swiveling out, and the sharpness of the display content increases within the second object, in particular, in response to swiveling in. In this manner, the disappearance of the first object and the emergence of the second object may also be visualized for the user by the way the display content of the objects is represented.

A time interval for displaying the object may be assigned to the first object. Once the time interval has elapsed, the display on the display area automatically changes to the second object. The graphic objects may be assigned to music titles or to sets of music, for example. The music title or the set of music, i.e., an album, runs for a specific time interval. Once the time interval has elapsed, the next music title, respectively the next album is automatically played. When the transition is made from one music title to another, respectively from one album to another, the graphical object assigned to the first music title, respectively to the first album, is swiveled out, and the second graphical object of the music title, respectively of the second album, is swiveled in, allowing the user to simply and intuitively understand the change.

Moreover, the change from the first to the second object may be initiated by a user. For example, the user may actuate an input device in order to initiate the change.

The control device may generate graphic data for successive intermediate images for representing the swiveling out of the first object and/or the swiveling in of the second object. Thus, an animation is represented. In addition, the swiveling is subdivided into a first phase, where the pixels of the graphical object are moved at an accelerated rate, and into a second phase, where the pixels of the graphical object are decelerated.

Here, accelerated movement is understood to be a positive acceleration where velocity increases, and decelerated movement is understood to be a negative acceleration where velocity decreases.

The display area may be arranged in a motor vehicle. In this case, the velocity of the motor vehicle may be measured, for example, and the duration of the swiveling in and/or of swiveling out and/or the duration of the first and/or second phase may be ascertained as a function of the velocity of the motor vehicle. The duration of the swiveling is preferably all the longer, the greater the velocity of the motor vehicle is. Namely, at higher velocities, the driver is only able to direct his/her gaze at the display for relatively short time intervals. Moreover, the time intervals during which the driver directs his/her gaze at the display are spaced apart more since, at higher velocities, the driver must be much more attentive to the driving situation. Thus, coupling the swiveling duration of the two-dimensional object to the velocity of the motor vehicle ensures that, at higher velocities, the driver retains the orientation in the information representation and, in this manner is able to simply, quickly and intuitively grasp the information content.

The display device according to example embodiments of the present invention is characterized in that the graphic data may be changed by the control device such that, when a change is made to the second graphical object, graphic data may be generated that control the display area such that, in the perspective representation on the display area, the first graphical object is swiveled out about a first axis disposed outside of the display area, and, in the perspective representation on the display area, the second graphical object is swiveled in about a second axis disposed outside of the display area, until it is fully displayed.

The display device is adapted, in particular, to be able to partially or completely implement the above described method.

In example embodiments of the display device, an input device is provided, the change from the first to the second object being able to be initiated in response to an input into the input device. In particular, the input device may be a touch-sensitive surface of the display area. Moreover, the input device may be adapted to be able to capture and evaluate a gesture made by the user in front of the display area.

Finally, example embodiments of the present invention provide a motor vehicle having the above described display device.

Example embodiments of the present invention are explained in greater detail below with reference to the Figures.

DETAILED DESCRIPTION

Figure 1:
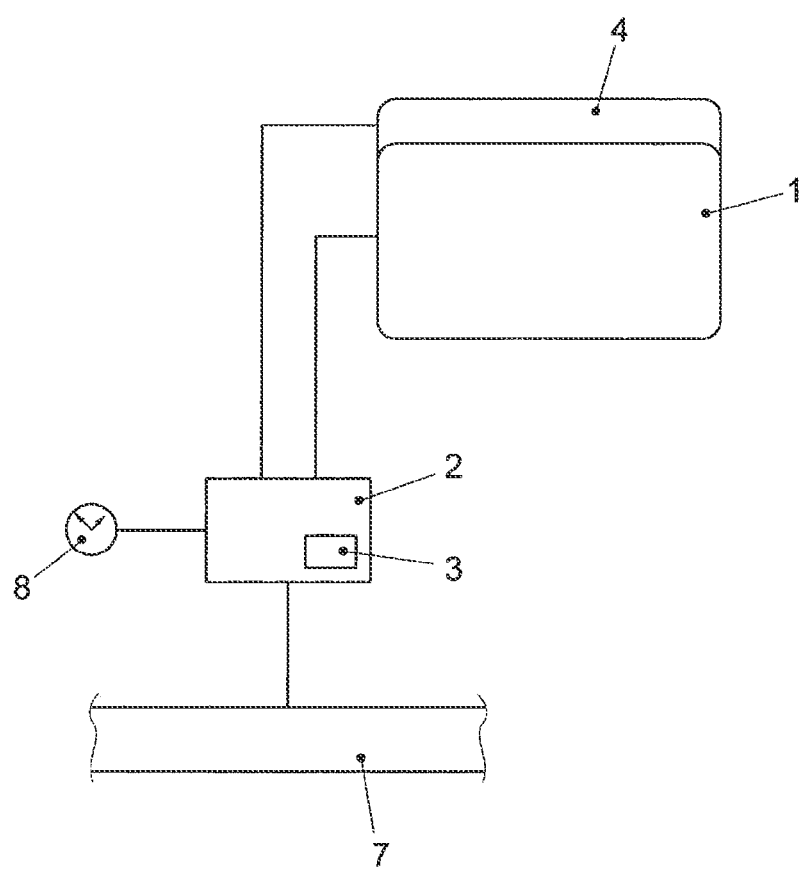
FIG. 1 schematically illustrates a display device according to an example embodiment of the present invention and the coupling of this display device to other devices of the motor vehicle.

The exemplary embodiment described in the following relates to the use of the display device and of the method in a vehicle, in particular in a motor vehicle. Through the use of the display device and the method, information may be displayed for the vehicle occupants. However, it should be noted that the display device and the method may be used in other devices, such as mobile devices, for example.

The display device includes a display area 1 that is arranged in the passenger compartment of the vehicle in a manner that makes it easily visible to at least one vehicle occupant, in particular to the driver. Display area 1 may be provided by a display, in particular a liquid crystal display, of any given design.

Display area 1 is connected to a control device 2, which may generate graphic data for graphical objects that are displayable on display area 1. In addition, control device 2 is connected to an input device 4 via which the user may control devices of the vehicle whose information is displayed on display area 1.

Input device 4 may be a device for capturing and evaluating a gesture of a body part of a user, for example. For instance, the hand of the user may make a gesture in front of display area 1. In this context, the three-dimensional position of the hand is detected in a specific location area in front of display area 1, without requiring that display area 1 be touched. The permitted location area depends on the configuration of display area 1 in the motor vehicle. The area should be selected in a manner that allows the presence of the hand of a user in this location area to be uniquely coupled to an operation of input device 4. The boundary of the location area may reside, for example, 40 to 10 cm in front of display area 1. If the hand of the user is moved toward display area 1 closer than this threshold value, this is recognized by display device 4, and the approach is interpreted as an operator control intention. This may lead, for example, to the objects displayed by display area 1 being displayed differently. In addition, this may be interpreted as an input, which leads to a change in the graphical object, as will be explained in detail further below. Input device 4 detects the position and the movement of the hand of the user in the location area. In this context, different gestures made by the hand are recognized and interpreted as inputs.

Input device 4 may include infrared light sources and infrared light receivers, for example, which detect the infrared light reflected by the hand. Details of such an input device are described in German Patent No. 100 58 244, which is hereby incorporated by reference. Other input devices, which may be used in conjunction with the display device, are described in the following publications: German Published Patent Applications Nos. 103 05 341 and 10 2004 048 956.

Moreover, the position of the hand and its change over time may also be captured by an optical system. In this system, a light-emitting diode emits square-wave, amplitude-modulated light, for example. This light is reflected by the object to be detected, i.e., the hand, and, upon reflection, impinges on a photodiode. Another light-emitting diode likewise emits square-wave, amplitude-modulated light that impinges on the photodiode, which, however, is 180° phase-shifted. In the case of the photodiode, the two light signals are superimposed and cancel each other if they have the exact same amplitude. If the signals in the case of the photodiode do not cancel each other, the light emission of the second diode is controlled by a control circuit in such a way that the total received signal again adds to zero. If the position of the object changes, the light component, which travels from the first light-emitting diode to the photodiode via the reflection at the object, also changes. As a result, the intensity of the second light-emitting diode is adjusted by the control circuit. Thus, the control signal is a measure of the reflection of the light which is emitted by the first diode and impinges on the object. Thus, from the control signal, it is possible to derive a signal that is characteristic of the position of the object.

In addition, the input device may be a touch-sensitive film that is provided on display area 1. The film may be used to detect the position of a touch on display area 1 arranged behind the film. The film may be arranged as a resistive touch film, a capacitive touch film or a piezoelectric film, for example. In addition, the film may be adapted to allow measurement of a heat flow emanating from the finger of a user, for example. Different inputs may be obtained from the progression over time of the touching of the film. For example, in the simplest case, the touching of the film at a specific position may be assigned to a graphical action button displayed on display area 1.

Finally, an offset control element may be used as an input device. The offset control element is, in particular, a mechanical control element. A rotary switch may be provided, for example, which may be used to control objects displayed on the display and to select the objects in response to pressing of the rotary switch. Moreover, the rotary switch may also be used to directly input an angle of rotation, as is explained further below. Separate pressure-operated switches may also be configured around the rotary switch; the configuration of display fields on the display area that are assigned to the pressure-operated switches corresponding at least schematically to the configuration of the pressure-operated switches.

In addition, control device 2 is coupled to a system clock 8 and to a vehicle bus 7. Control device 2 is coupled via vehicle bus 7 to driver assistance systems of the vehicle. Via vehicle bus 7, control device 7 receives data from these driver assistance systems and processes the data such that they are graphically displayed to the driver, respectively the vehicle occupants via display area 1. For this purpose, control device 2 generates graphic data for objects that are displayable on display area 1, which, inter alia, graphically display the information pertaining to the driver assistance systems. In addition, control device 2 is coupled via vehicle bus 7 to various information and communication devices, as well as entertainment devices of the vehicle. The diverse information pertaining to these devices of the vehicle is processed in control device 2 and converted into graphic data for a graphic representation. To provide animations of the graphic representation on the display area, the control device includes a processing unit 3 which accesses system clock 8 when generating intermediate images.

A method according to an example embodiment of the present invention that may be realized by the display device described above is explained in detail in the following with reference to FIG. 2 through 10.

Figure 2:
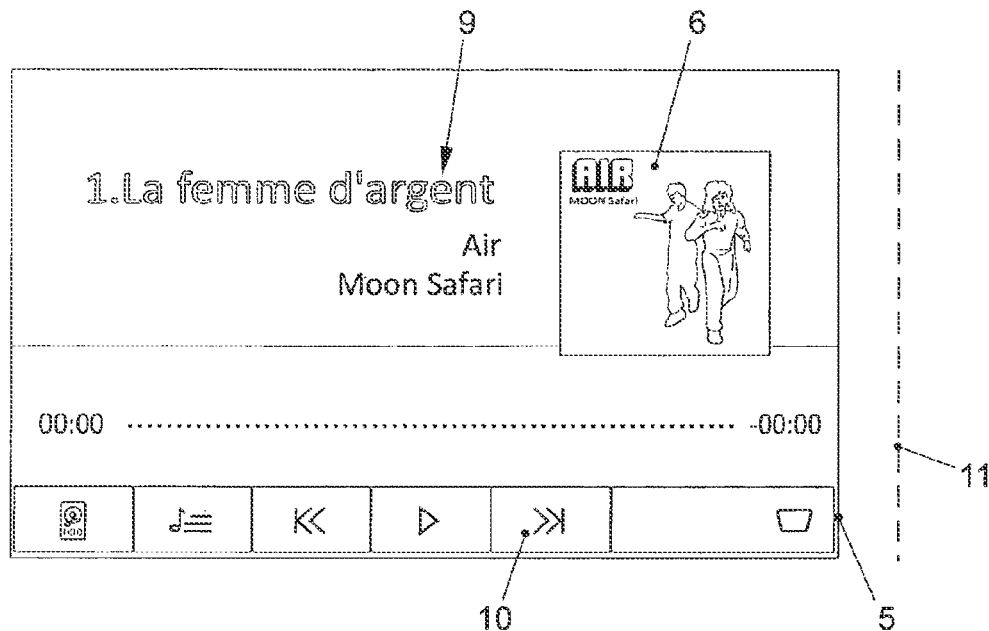
FIG. 2 through 10 illustrate, on the basis of an exemplary embodiment, displays generated by the method according to an example embodiment of the present invention on the display area.
Figure 3:
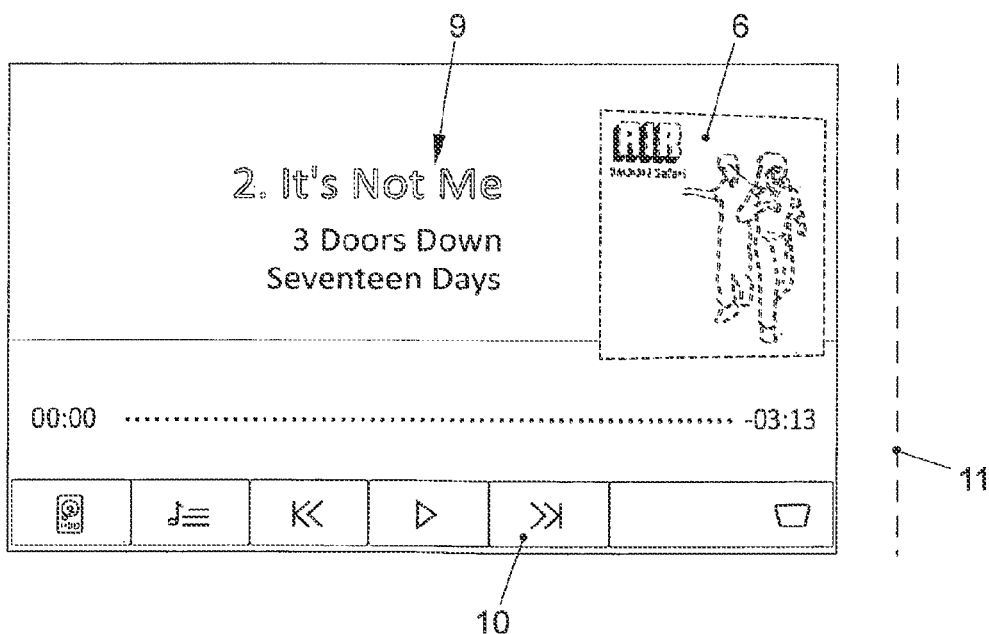
Figure 4:
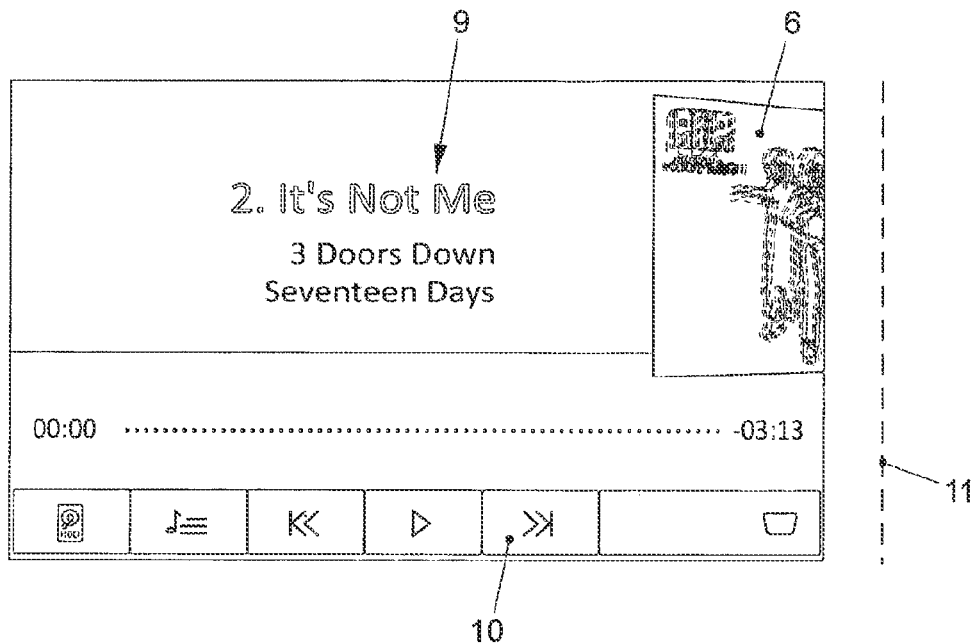
Figure 5:
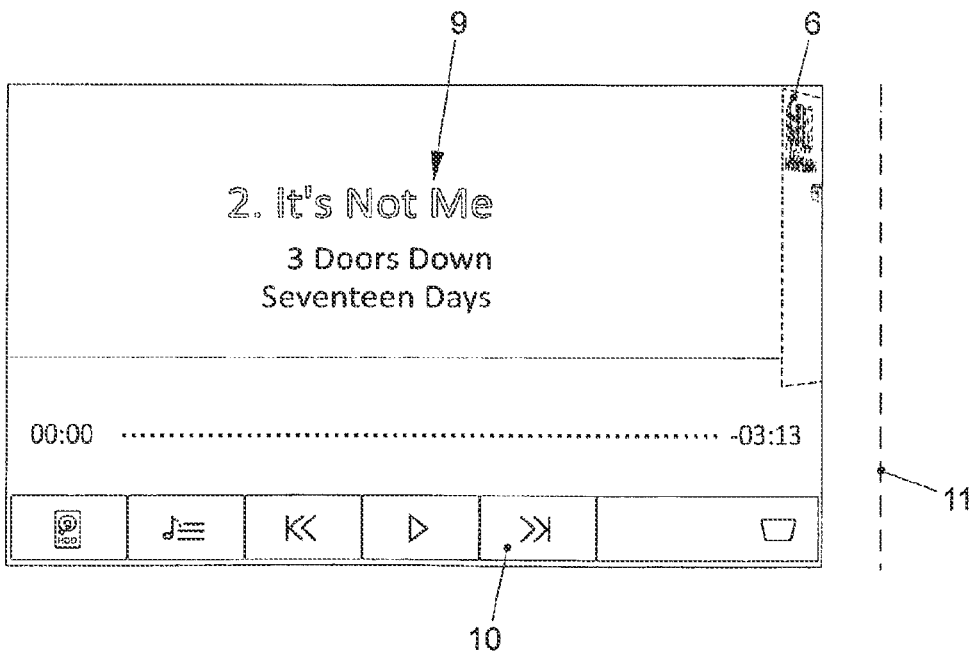

In the initial state of the method, the information provided in FIG. 2 is displayed by display area 1. The display encompasses a two-dimensional graphical object 6. In the present exemplary embodiment, the display content of object 6 is the representation of a music album cover. Alphanumeric information belonging to graphical object 6 is displayed alongside graphical object 6, in display field 9. In the present case, the artists belonging to the album cover, the name of the album, and the current music title of the album are displayed. Furthermore, various action buttons for controlling the music playback, as well as for navigating among the stored music titles are represented in a bar. This bar also includes action button 10 which is used for changing the album. If the user actuates action button 10 via input device 4, control device 2 controls the music system of the vehicle via vehicle bus 7 such that the first title of the next album is played. In addition, control device 2 generates graphic data for display area 1 which visualizes this change of album. This change in the display content on display area 1 in response to actuation of action button 10 is explained in the following with reference to FIG. 3 through 10:

In the first instance, the display content changes in display field 9. The new display content describes information about the next album. At the same time, two-dimensional graphical object 6 is swiveled out about an imaginary axis 11 disposed outside of display area 1. This swiveling motion is visualized on display area 1 by a perspective representation of object 6, as is shown in FIG. 2 through 6. It is noted that swiveling axis 1.1 could also coincide with lateral edge 13 of display area 1.

Figure 6:
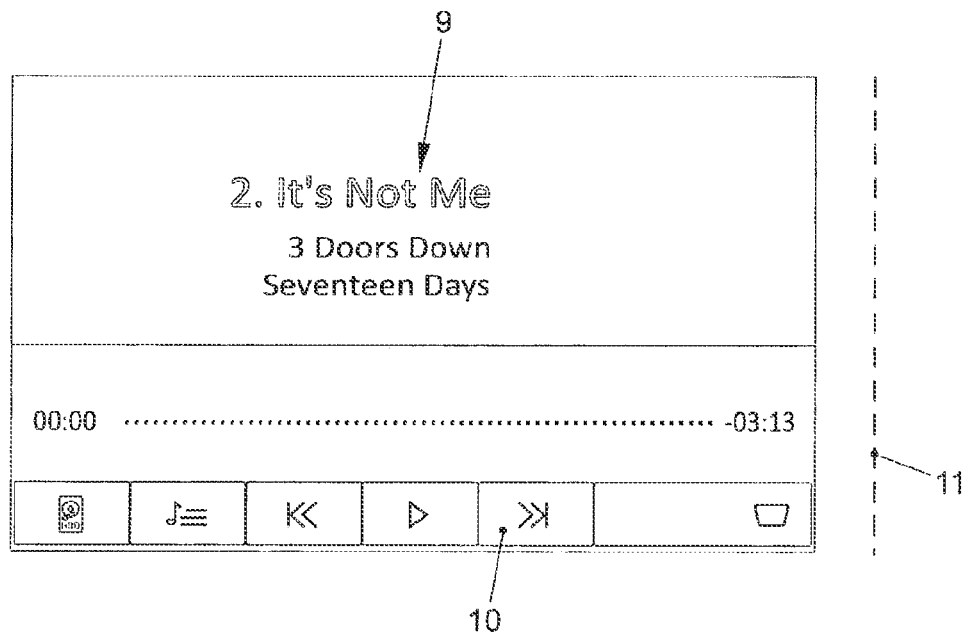
Figure 7:
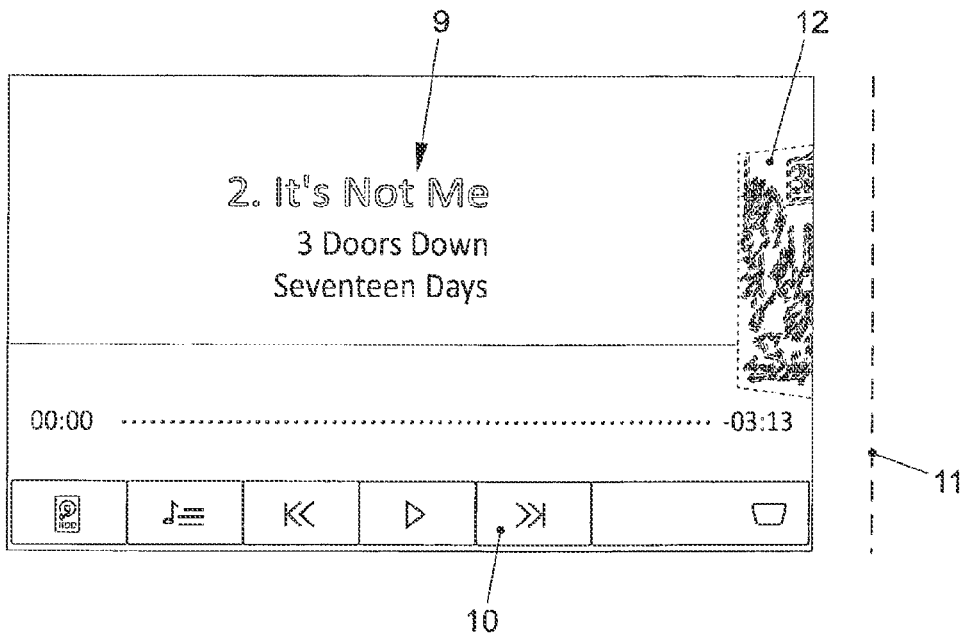
Figure 8:
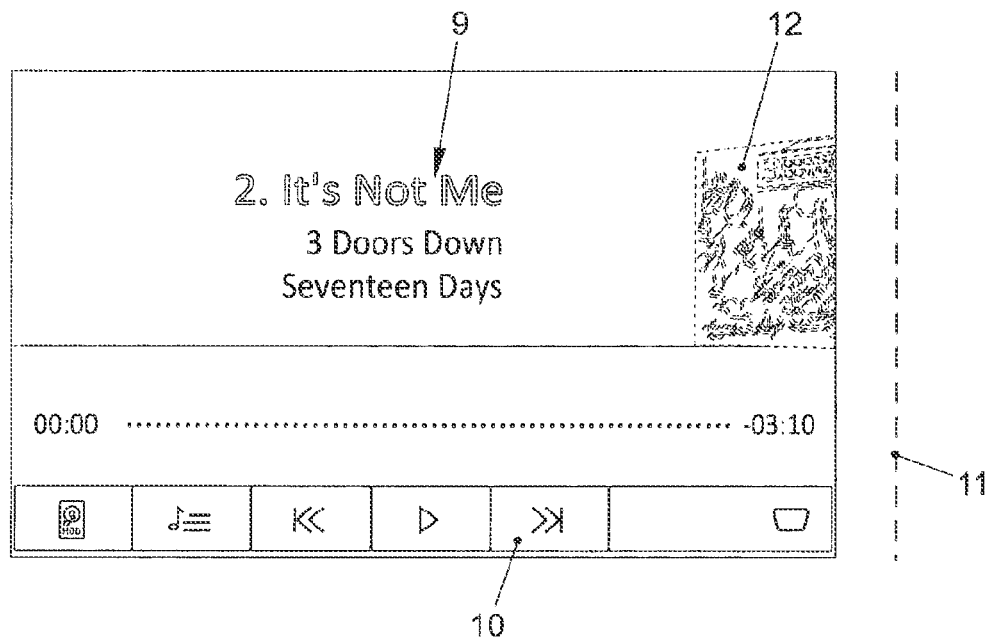
Figure 9:
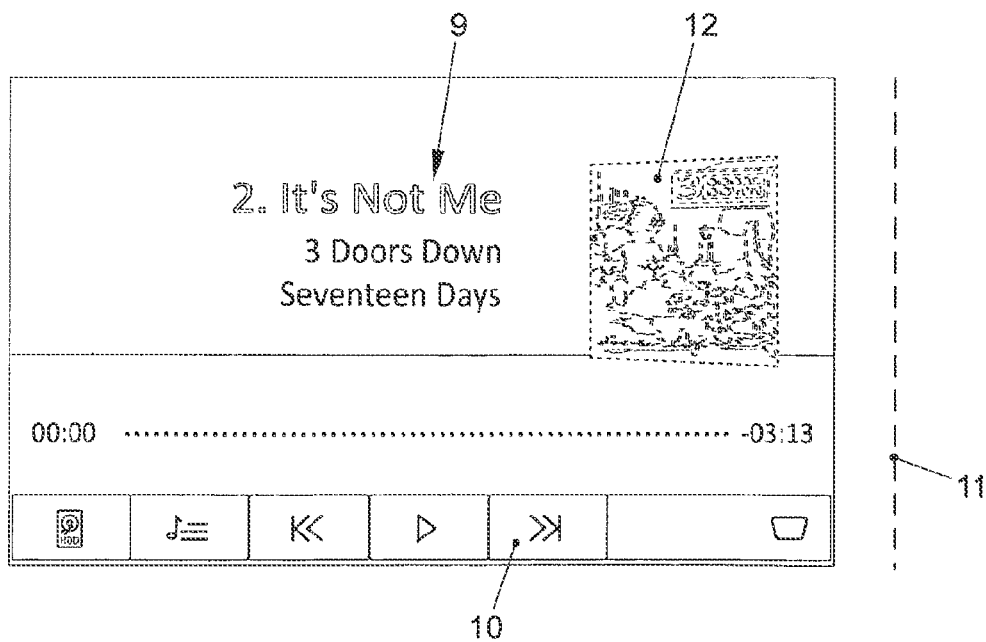

When graphical object 6 has completely disappeared, as shown in FIG. 6, a second two-dimensional graphical object 12 in a perspective representation on display area 1 is swiveled in around same axis 11, as shown in FIG. 7 through 10. Second graphical object 12 is assigned to the album whose music titles are played in response to actuation of action button 10.

Figure 10:
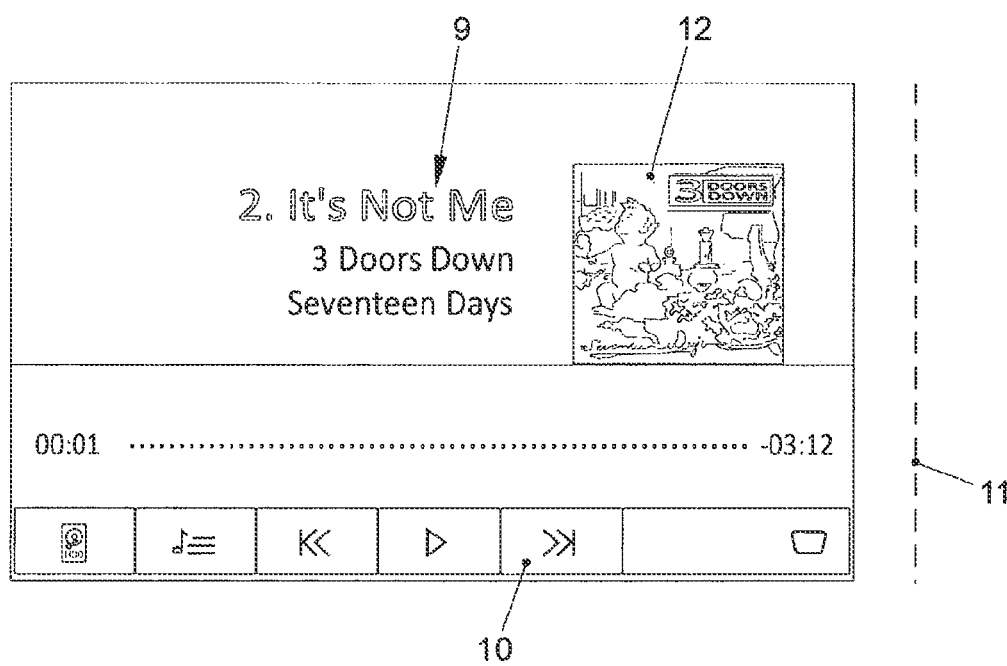

As is discernible in the figures, the cover, represented by graphical object 6, is shown as becoming successively less and less sharply defined when swiveling out of the display; on the other hand, the cover of second graphical object 12 is initially shown as being unsharply defined and, upon swiveling into the display, is shown as becoming successively sharper until it is shown as being sharply defined, as in FIG. 10.

The swiveling out of graphical object 6 and the swiveling in of graphical object 12 represent a transition between two static representations on display area 1. It is intended that this transition make it easier and as simple as possible for the viewer to establish a relation between the initial state prior to the swiveling and the end state subsequently thereto. For this reason, a fluid transition between the two states is described, where intermediate images are shown that clarify the transition between the two static representations. The time sequence of the swiveling motion is explained in the following on the basis of the swiveling of two-dimensional graphical object 6. The swiveling in of two-dimensional graphical object 12 takes place analogously.

The swiveling of the graphical object is subdivided into two phases. In the first phase, object 6 is swiveled 45° about axis 11 from an initial position shown in FIG. 2. In a second phase, graphical object 6 is swiveled further to a swivel angle of 90°, so that it is no longer visible, as shown in FIG. 6. During swiveling, the display content of graphical object 6 continues to be displayed perspectively, the sharpness changing as explained above. In this context, the swiveling motion is perspectively represented in a way that allows the viewer to look directly at graphical object 6; i.e., the viewing direction for the perspective representation extends in parallel to the normal of display area 1.

If, for example, one looks at the left edge of graphical object 6, the viewpoints of this edge shift to the right. In the same way, one may view the swivel angle by which graphical object 6 has been swiveled about axis 11. The parameterization of the swiveling motion is described in the following on the basis of position x which, for example, may represent the position of the left edge of graphical object 6 in a direction orthogonal to swivel axis 11.

The swiveling of graphical object 6 is represented by two successive intermediate images which display successive positions of the viewpoints of graphical object 6. When calculating the graphic data for these positions x, the following computational steps are performed in the first phase:

$$n = \frac{t - t_0}{d_1}; \qquad (i)$$

$$x = b_1 + c_1 \cdot n^4; \qquad (ii)$$

t being a system time when the generated graphic data are displayed on display area 1;
at the swiveling begin of the first phase, t being=$t_o$;
$d_1$ being the duration of the first phase;
$b_1$ being the initial position of the viewpoint of graphical object 6;
$c_1$ being the entire shift of the viewpoint of graphical object 6 in the first phase and steps (i) and (ii) being repeated until $t > (t_o + d_1)$.

For the second phase, the following computational steps are performed:

$$n = \frac{t - t_0}{d_1} - 1; \qquad (i)$$

$$x = b_2 + c_2 \cdot (1 - n^4); \qquad (ii)$$

t being a system time when the generated graphic data are displayed on display area 1 at the begin of swiveling in the second phase, t being=$t_o$;
$d_2$ being the duration of the second phase;
$b_2$ being the initial position of the viewpoint of graphical object 6;
$c_2$ being the total shift of the viewpoint of graphical object 6 in the second phase;
and steps (i) and (ii) being repeated until it holds that: $t > (t_o + d_2)$.

The computational steps are performed by processing unit 3 of control device 2; system time t being transmitted by system clock 8 to processing unit 3.

In a further refinement of the exemplary embodiment, the data of the speedometer of the motor vehicle are transmitted via vehicle bus 7 to control device 2 and thus to processing unit 3. Processing unit 3 uses these data to ascertain the duration of the swiveling for both phases. In this context, the duration of the swiveling is all the longer, the greater the velocity of the motor vehicle is.

LIST OF REFERENCE NUMERALS

1 display area
2 control device
3 processing unit
4 input device
5 side edge of display area 1
6 graphical object
7 vehicle bus
8 system clock
9 display field
10 action button
11 swivel axis
12 graphical object

What is claimed is:

1. A method for displaying information in a display area in a motor vehicle, comprising:
    graphically displaying at least one first graphical object on the display area; and
    generating, by a control device, based on a change to a second graphical object, graphic data that controls the display area to cause the first graphical object to disappear and the second graphical object to be faded in, such that, in a perspective representation on the display area, the first graphical object is swiveled out about a first axis disposed apart from and outside of the display area, and, in the perspective representation on the display area, the second graphical object is swiveled in about a second axis disposed apart from and outside of the display area, until the second graphical object is fully displayed, wherein the first axis and the second axis coincide;
    wherein a duration of the swiveling in and/or of the swiveling out is ascertained as a function of the velocity of the motor vehicle, such that the duration of the swiveling in and/or of the swiveling out is longer at greater velocities of the motor vehicle and shorter at lesser velocities of the motor vehicle.

2. The method according to claim 1, wherein the first axis and/or the second axis is oriented in parallel to one side of the display area.

3. The method according to claim 1, wherein the first graphical object and the second graphical object swivel in a same direction of rotation.

4. The method according to claim 1, wherein at least one portion of the second graphical object is displayed only when the first graphical object is no longer displayed.

5. The method according to claim 1, wherein sharpness of the display content changes within the first graphical object and/or the second graphical object during swiveling.

6. The method according to claim 5, wherein the sharpness of the display content decreases within the first graphical object upon swiveling out; and the sharpness of the display content increases within the second graphical object upon swiveling in.

7. The method according to claim 1, wherein a time interval for displaying the object is assigned to the first graphical object, and, once the time interval has elapsed, the display on the display area automatically changes to the second graphical object.

8. The method according to claim 1, wherein the change from the first graphical object to the second graphical object is initiated by a user.

9. The method according to claim 1, wherein the control device generates graphic data for successive intermediate images for representing the swiveling out of the first graphical object and/or the swiveling in of the second graphical object, the swiveling being subdivided into a first phase in which pixels of the graphical object are moved at an accelerated rate, and into a second phase in which the pixels of the graphical object are moved at a decelerated rate.

10. The method according to claim 9, wherein a duration of the first phase and/or the second phase is ascertained as a function of the velocity of the motor vehicle.

11. A display device for displaying information in a display area in a motor vehicle, comprising:
 the display area adapted to graphically represent graphical objects; and
 a control device adapted to generate, based on a change from a first graphical object to a second graphical object, graphic data that controls the display area to cause the first graphical object to disappear and the second graphical object to be faded in, such that, in a perspective representation on the display area, the first graphical object is swiveled out about a first axis disposed apart from and outside of the display area, and, in the perspective representation on the display area, the second graphical object is swiveled in about a second axis disposed apart from and outside of the display area, until the second graphical object is fully displayed, wherein the first axis and the second axis coincide;
 wherein a duration of the swiveling in and/or of the swiveling out is ascertained as a function of the velocity of the motor vehicle, such that the duration of the swiveling in and/or of the swiveling out is longer for greater velocities of the motor vehicle and shorter for lesser velocities of the motor vehicle.

12. The display device according to claim 11, further comprising an input device adapted to initiate the change from the first graphical object to the second graphical object in response to an input into the input device.

* * * * *